(12) United States Patent
Black et al.

(10) Patent No.: US 11,566,962 B2
(45) Date of Patent: Jan. 31, 2023

(54) LEAK DETECTION SYSTEM AND METHOD

(71) Applicant: Cascade Technologies Holdings Limited, Stirling (GB)

(72) Inventors: Paul Black, Stirling (GB); Tom Hunter, Stirling (GB)

(73) Assignee: Pure Storage, Inc., Mountain View, CA (US)

( * ) Notice: Subject to any disclaimer, the term of this patent is extended or adjusted under 35 U.S.C. 154(b) by 415 days.

(21) Appl. No.: 16/107,734

(22) Filed: Aug. 21, 2018

(65) Prior Publication Data

US 2020/0056957 A1 Feb. 20, 2020

(51) Int. Cl.
| | |
|---|---|
| *G01M 3/32* | (2006.01) |
| *G01M 3/00* | (2006.01) |
| *G01M 3/28* | (2006.01) |
| *G01N 1/22* | (2006.01) |

(52) U.S. Cl.
CPC .......... *G01M 3/3209* (2013.01); *G01M 3/007* (2013.01); *G01M 3/2807* (2013.01); *G01N 1/22* (2013.01)

(58) Field of Classification Search
CPC .. G01M 3/3209; G01M 3/007; G01M 3/2807; G01M 3/20; G01M 3/38; G01M 3/329; G01N 1/22; G01N 21/90; G01N 2021/8845; G01N 21/3504; G01N 21/63
See application file for complete search history.

(56) References Cited

U.S. PATENT DOCUMENTS

| | | | | |
|---|---|---|---|---|
| 9,939,342 B2 * | 4/2018 | Howieson | ............. | G01M 3/229 |
| 10,180,393 B2 * | 1/2019 | Black | ..................... | G01N 21/01 |
| 10,724,945 B2 * | 7/2020 | Black | .................. | G01N 21/3504 |
| 10,830,660 B2 * | 11/2020 | Miller | ..................... | G01M 3/16 |
| 11,199,468 B2 * | 12/2021 | Wetzig | ................ | G01M 3/3218 |

(Continued)

FOREIGN PATENT DOCUMENTS

| | | | | | |
|---|---|---|---|---|---|
| EP | | 3208603 A1 * | 8/2017 | ......... | G01N 21/0303 |
| WO | WO-2017191465 A2 * | | 11/2017 | ........... | B07C 5/3404 |
| WO | WO-2020035692 A1 * | | 2/2020 | ............ | G01M 3/007 |

OTHER PUBLICATIONS

International Search Report and Written Opinion dated Jan. 27, 2020 in International App. PCT/GB2019/052293 filed Aug. 15, 2019.

(Continued)

*Primary Examiner* — Nimeshkumar D Patel
*Assistant Examiner* — Gedeon M Kidanu
(74) *Attorney, Agent, or Firm* — Womble Bond Dickinson (US) LLP

(57) ABSTRACT

A method of testing the structural integrity of a rigid container comprises performing a sampling process on the rigid container comprising sampling a volume of sample gas from a sampling region associated with the rigid container, wherein the method further comprises performing a detection process comprising producing one or more laser beams for excitation of one or more materials that may be in the volume of sample gas, wherein the one or more materials are representative of a gas and/or vapour and/or a liquid leak from the rigid container and detecting light that has passed through the volume of sample gas, and determining the presence and/or absence and/or amount of said one or more materials in the volume of sample gas based on detected light.

36 Claims, 12 Drawing Sheets

(56) References Cited

U.S. PATENT DOCUMENTS

| | | |
|---|---|---|
| 2015/0083918 A1 | 3/2015 | Emmenegger |
| 2016/0169796 A1* | 6/2016 | Lewander Xu ........ G01N 21/27 356/437 |
| 2017/0108397 A1* | 4/2017 | Miller .................... G01M 3/38 |
| 2017/0299459 A1* | 10/2017 | Spartz ................. G01M 3/3281 |
| 2019/0178745 A1* | 6/2019 | Hann .................... G01M 3/227 |

OTHER PUBLICATIONS

EP Examination Report dated Jun. 30, 2022 in App No. EP 19 758 468.3.

* cited by examiner

314

Roller Fully Down

Section G-G

Roller Fully Up

Section H-H

LEAK DETECTION SYSTEM AND METHOD

INTRODUCTION

The present invention relates to a laser detection system and method for detecting leaks from and/or structural defects of containers, in particular, for detecting leaks from and/or structural defects of food and/or beverage containers.

BACKGROUND

Known leak detection methods for food and/or drink packaging, including food and/or drink containers, typically place each container under a vacuum and detect leaks through pressure change. This can be performed offline on single containers or on-line.

Other methods include water bath testing, where the container is submerged under water and if there is a leak then the operator may see bubbles. This inspection method may be inefficient and/or destructive, meaning the package and its contents must be disposed of.

WO 2017/191465 describes a leak detection system for detecting breaches in sealed food containers. The detection system described includes at least one pressing member configured to apply pressure to the sealed food container. WO 2017/191465 considers sealed food containers, in particular, modified atmosphere food containers such as trays and packs. WO 2017/191465 also considers film-topped trays and sealed bags.

In some circumstances, for example, for rigid containers, testing for a leak by applying a pressure to the rigid container may not be suitable for extracting a sample for further analysis. There is a need for an improved or at least alternative leak detection system, in particular, a system for detecting leaks from different types of containers.

SUMMARY

In a first aspect of the invention there is provided a method of testing the structural integrity of a rigid container comprising:
  performing a sampling process on the rigid container comprising: sampling a volume of sample gas from a sampling region associated with the rigid container; wherein the method further comprises:
  performing a detection process comprising:
  producing one or more laser beams for excitation of one or more materials that may be in the volume of sample gas, wherein the one or more materials are representative of a gas and/or vapour and/or a liquid leak from the rigid container; and
  detecting light that has passed through the volume of sample gas and determining the presence and/or absence and/or amount of said one or more materials in the volume of sample gas based on detected light.

The presence and/or absence and/or amount of the one or more materials may be representative of at least one of: one or more breaches in the surface of the rigid container, the quality of a seal of the rigid container, a gas, liquid or vapour leak from the rigid container.

The sampling process may comprise providing the volume of sample gas to a sample chamber and the light may be detected from the sample chamber.

The sampling process may further comprise applying a pressure or force.

The rigid container may be provided inside further packaging. The sampling process may comprise applying a pressure or force to at least one surface of the further packaging thereby to extract accumulated leaked gas or vapour from said further packaging.

The further packaging may be non-rigid. The gas or vapour sample may be extracted through one or more holes or gaps in the surface of the packaging. The rigid container may be sealed or closed for at least one of: prevention of tampering, preservation of contents, prevent leakage, hygiene purposes. The further packaging may be closed for holding and/or transporting the container.

The method may allow quick detection of broken or leaking bottles inside a container.

The method may further comprise providing a sample head for use in performing the sampling process.

The sample head may comprise a shape that complements at least part of the rigid container.

The method may further comprise selecting a shape of the sample head such that the at least part of the rigid container comes within a distance of 20 mm or less from the sample head during the sampling process.

The at least part of the rigid container may come within a distance of 1 cm or less, optionally within a distance of 50 mm or less, optionally within a distance of 20 mm or less from the sample head during the sampling process.

The method may further comprise passing the rigid container through and/or past the sample head and performing the sampling process as the rigid container passes through and/or past the sample head.

The sample head may define at least part of an aperture to allow the rigid container to pass through and the method may further comprise performing the sampling process as the rigid container passes through the aperture. The aperture may have a profile substantially equal or matched to the shape of rigid container.

The sample head may comprise one or more of a size or a shape such that the container can pass through the aperture.

The method may further comprise aligning at least part of the rigid container with at least part of the sample head.

The method may further comprise sampling the volume of sample gas from a plurality of sample inputs that are distributed about the rigid container during the sampling process such that the sample region at least partially surrounds the rigid container.

The plurality of sample inputs may be distributed such that the sample region surrounds an upper portion of the rigid container.

The plurality of sample inputs may be distributed such that the sample region extends about a length and/or a width of the rigid container.

The method may further comprise providing a plurality of sample inputs that are distributed along a first direction and moving the rigid container through the plurality of sample inputs in a second, different direction.

The first direction may correspond to a first dimension of the rigid container, for example, height, width or length. The first direction and second direction may be substantially orthogonal.

The plurality of sample inputs may comprise a plurality of holes of different sizes to produce an even distribution of suction during the sampling process.

The method may further comprise providing a deformable sample member comprising a plurality of sample inputs distributed along its length and selecting a shape for the deformable sample head thereby to: match a shape of at least part of the rigid container and/or to minimize a gap between the plurality of sample inputs and at least part of a surface of the rigid container during the sampling process.

The sampling process may comprise moving a moveable sample head proximate to at least one surface of the container.

The sampling process may comprise moving of a moveable hand held device by a user.

The moveable sample head and/or moveable hand held device may comprise a sample head comprising a plurality of sample inlet holes.

The sampling process may comprise performing a suction or a blowing process to move the sample of gas or vapour from the sampling region to a sample chamber. The suction or blowing process may be performed continuously.

The method may further comprise performing the sampling process on more than one rigid container and the suction or blowing process comprises providing a continuous air flow as the sampling process is performed on subsequent rigid containers.

The method may further comprise providing a substantially empty rigid container. The method may further comprise providing a rigid container that contains substantially no liquid and/or substantially no solid. The method may further comprise providing a test gas to the container.

The method may further comprise injecting the test gas into the container to force the sample gas from the container.

The method may further comprise providing the test gas to a substantially empty container.

The method may further comprise providing the test gas to the empty rigid container thereby to place the rigid container under pressure before the sampling process is performed.

The test gas may be one of carbon dioxide, CO2, or compressed air.

The one or more materials may comprise at least one of: carbon dioxide (CO2), ethanol, carbon monoxide (CO), nitrous oxide (N2O).

The rigid container may comprise at least one of:
a drink container, an alcoholic or distilled drink container, a pharmaceutical product container, a medicine container, a perfume container, a barrel, a bottle, a dairy product container.

In a second aspect of the invention, which may be provided independently, there is provided a system for testing the structural integrity of a rigid container comprising:
a sampling apparatus for sampling gas from a sampling region associated with the rigid container;
one or more lasers configured to produce one or more laser beams for excitation of one or more materials that may be in the volume of sample gas, wherein the one or more materials are representative of a gas and/or vapour and/or a liquid leak from the rigid container; and
a detector apparatus for detecting light that has passed through the volume of sample gas and determining the presence and/or absence and/or amount of said one or more different materials in the collected sample based on detected light.

The system may further comprise a sample chamber configured to receive a volume of sample gas wherein the sampling apparatus is configured to provide the volume of sample gas to the sample chamber.

The system may further comprise a sample cell configured to receive the volume of sample gas.

The sampling apparatus may further comprise a pressure apparatus configured to apply a pressure or force to further packaging containing the rigid container thereby to extract accumulated leaked gas or vapour from said further packaging.

The pressure apparatus may further comprise at least one roller and/or at least one pressing member.

The pressure apparatus may be configured to apply a linear and/or a rotational force.

The further packaging may be non-rigid. The gas sample may be extracted through one or more holes or gaps in the surface of the packaging. The rigid container may be sealed or closed for at least one of: the prevention of tampering, the preservation of contents, to prevent leakage, for hygiene purposes. The further packaging may be closed for holding and/or transporting the container.

The sampling apparatus may further comprise a sample head wherein the sample head comprises a shape that complements at least part of the rigid container.

The shape of the sample head may be such that the at least part of the rigid container comes within a distance of 20 mm from the sample head during the sampling process.

The shape of the sample head may be such that at least part of the rigid container comes within a distance of 1 cm, optionally within a distance of 50 mm, further optionally within a distance of 20 mm from the sample head during the sampling process.

The sample head may define at least part of an aperture for the rigid container to pass through.

The system may further comprise an alignment mechanism for aligning at least part of the rigid container with at least part of the sample head.

The sample head may further comprise a plurality of sample inputs distributed along its length such that, during the sampling process, the sample region at least partially surrounds the rigid container.

The sample head may further comprise a plurality of sample inputs distributed along its length such that the sample region surrounds an upper region of the rigid container.

The sample head may further comprise a plurality of sample inputs distributed along its length such that the sample region extends along a length of the rigid container.

The sample head may further comprise a least one deformable sample member comprising a plurality of sample inputs distributed along its length wherein the deformable member is configured to be deformed into a shape thereby to: match a shape of at least part of the rigid container and/or to minimize a gap between the plurality of sample inputs and at least part of a surface of the rigid container during the sampling process.

The sample head may comprise a shape that corresponds to at least one of:
a rectangular archway, a bottle-shaped archway.

The sample head may comprise a shape that is curved to match the shape of a barrel.

The sampling apparatus may be a hand held sample head, optionally wherein the sampling apparatus comprises a nozzle.

The system may further comprise a source for providing test gas to the rigid container via the sample head.

The system may further comprise a conveyer system for conveying at least a part of the rigid container past the sampling apparatus.

The conveyer system may comprise a linear conveyer belt for conveying the container linearly past the sampling apparatus.

The system may further comprise a mechanism for rotating the rigid container, such that at least part of the rigid container passes the sampling apparatus.

The system may further comprise a controller configured to control the one or more lasers to produce respective laser beams as the container is conveyed past the sampling apparatus.

The system may further comprise an air pump system for moving the sample gas from the sampling region to the sample chamber.

The one or more lasers may comprise at least one of: a semiconductor diode laser, optionally a quantum cascade laser, for example, a pulse, chirped quantum cascade laser.

In a third aspect of the invention, which may be provided independently, there is provided a method of detecting leaks from an alcoholic drink container the method comprising:
  performing a sampling process on the alcoholic drink container comprising:
    sampling a volume of sample gas from a sampling region associated with the rigid container;
  wherein the method further comprises:
    performing a detection process comprising:
      producing one or more laser beams for excitation of one or more materials that may be in the volume of sample gas, wherein the one or more materials are representative of a gas and/or vapour and/or a liquid leak from the alcoholic drink container; and
      detecting light that has passed through the volume of sample gas and determining the presence and/or absence and/or amount of said one or more materials in the sample gas based on detected light.

The one or more materials may comprise at least one of ethanol and/or carbon dioxide.

The one or more lasers may be configured to produce laser beams comprising at least one of:
  a) a laser beam having a first wavelength (wavenumber) in a wavelength (wavenumber) range between 2963 to 2968 $cm^{-1}$;
  b) a laser beam having a second wavelength (wavenumber) about 2250 $cm^{-1}$.

The one or more lasers may be configured to produce a laser beam having a first wavelength in a wavelength range between 2963 and 2968 $cm^{-1}$ used to detect ethanol in the volume of sample gas.

The one or more lasers may be configured to produce a laser beam having a wavelength about 2250 $cm^{-1}$ used to detect CO2 in the volume of sample gas.

The one or more lasers may be configured to produce a laser beam having a wavelength about 2250 $cm^{-1}$ used to detect N2O in the volume of sample gas.

The alcoholic drink container may be one of: a barrel, a bottle, a can, a flask, a keg.

In a fourth aspect of the invention, which may be provided independently, there is provided a laser detection system for testing the structural integrity of a container, the system comprising:
  a sampling apparatus for performing a sampling process comprising sampling gas from a sampling region associated with the container,
  wherein the system further comprises a pressure apparatus for exerting a pressure on the container prior to or before the sampling process;
  one or more lasers configured to produce one or more laser beams for excitation of one or more materials that may be in the volume of sample gas, wherein the one or more materials are representative of a gas and/or vapour and/or a liquid leak from the rigid container; and
  a detector apparatus for detecting light that has passed through the volume of sample gas determining the presence and/or absence and/or amount of said one or more different materials in the collected sample based on detected light.

The system may further comprise a sample chamber configured to receive a volume of sample gas wherein the sampling apparatus is configured to provide the volume of sample gas to the sample chamber.

The system may further comprise a sample cell configured to receive the volume of sample gas.

The sampling apparatus may provide a substantially enclosed space about the container.

The sampling apparatus may comprise an adjustable mounting for adjusting the distance between the pressure apparatus and the container.

The sampling apparatus may comprise at least one pressing member or roller and a sample head comprising a plurality of sample inlets, wherein the at least one pressing member is moveable relative to said sample head.

Any feature in one aspect of the invention may be applied to other aspects of the invention, in any appropriate combination. For example, apparatus features may be applied as method features and vice versa.

BRIEF DESCRIPTION OF THE DRAWINGS

Embodiments will now be described by way of example only, and with reference to the accompanying drawings, of which.

DETAILED DESCRIPTION OF THE DRAWINGS

The present invention is concerned with the problem of detecting leaks from containers. In particular, embodiments of the system for detecting leaks from rigid containers are described. In addition, leak detection systems for detecting leaks from non-rigid containers are also described.

Figure 1:
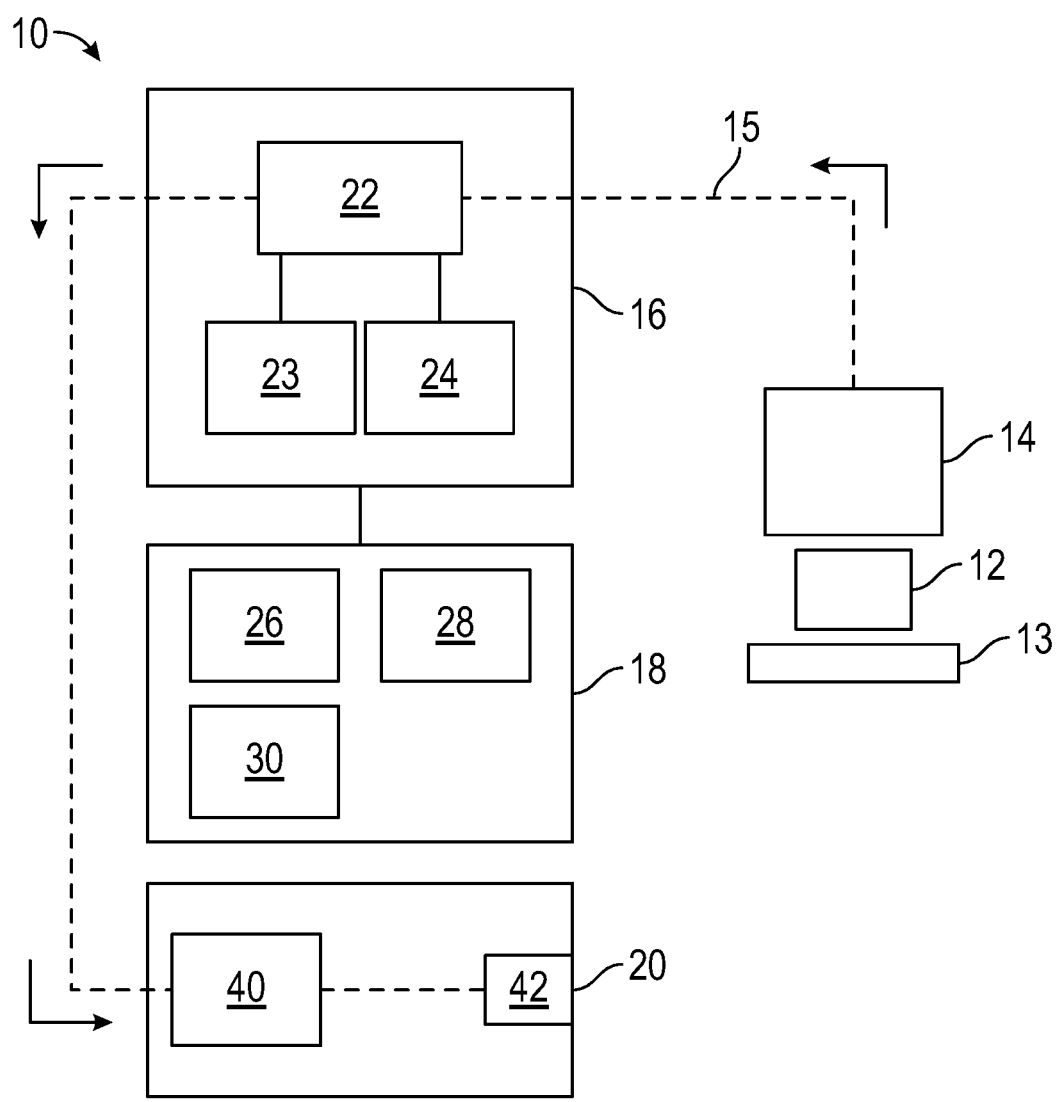
FIG. 1 is a schematic diagram of a leak detection system in accordance with embodiments.

FIG. 1 is a schematic representation of a laser spectroscopy system 10 for analysing gas and/or vapour sampled from a sampling region about a container 12. The system 10 has a sampling apparatus 14 for sampling a volume of sample gas from a sampling region associated with the container 12.

In FIG. 1, the container is tested in-line on a conveyer belt system 13 and the system is adapted so that gas and/or vapour is collected from a sampling region about the container on the conveyer belt system 13.

Although FIG. 1 shows laser detection system in use with a conveyer belt system, it will be understood, that in some embodiments, the container can be sampled off-line. In particular, the embodiments described with reference to FIG. 5 include a portable sampling apparatus capable of being moved about the surface of a container under test.

The laser spectroscopy system 10 may also be referred to as a leak detection system. By analysing a collected sample of gas and/or vapour using a laser detection process, the system is capable of determining the presence and/or absence and/or amount of one or more materials in the sample gas that is indicative of one of: a breach in the surface of the container, the state or quality of a seal of the container by detecting a leak of one or more of gas, vapour or liquid, from the container 12.

Different species of materials can be detected thereby to determine breaches in different types of containers. For example, $CO_2$ may be sensed for food containers, ethanol may be sensed for alcoholic drink containers (e.g. bottles, barrels or boxes) and $N_2O$ may be sensed for dairy products as an alternative to $CO_2$. Carbon monoxide can be used in meat packaging and may therefore be used to detect breaches in meat containers.

Detecting different species of material requires using laser light having different wavelengths. To detect ethanol, a laser beam having a first wavelength in a wavelength range between 2963 to 2968 $cm^{-1}$ is used. To detect $CO_2$ a laser beam having a wavelength at about 2250 $cm^{-1}$ is used. To detect $N_2O$ a laser beam having a wavelength about 2250 $cm^{-1}$ is used.

As shown in FIG. 1, in addition to the sampling apparatus 14, the leak detection system 10 has a sensor module 16, a controller 18 and an air pump system 20. In some embodiments, the sampling apparatus 14 may be referred to as a sample head.

The system 10 has an air circuit 15 for moving gas and/or vapour from the sampling region to the sample cell 22 of the sampling apparatus 14. The sample cell is provided inside an at least partially enclosed sample chamber. The air circuit 15 is illustrated in FIG. 1 as a dashed line. The air circuit 15 connects the sampling apparatus 14 to the air pump system 20. The sampling apparatus 14 has one or more sample inlets that provide an entrance for a sample to the air circuit 15.

Figure 2A:
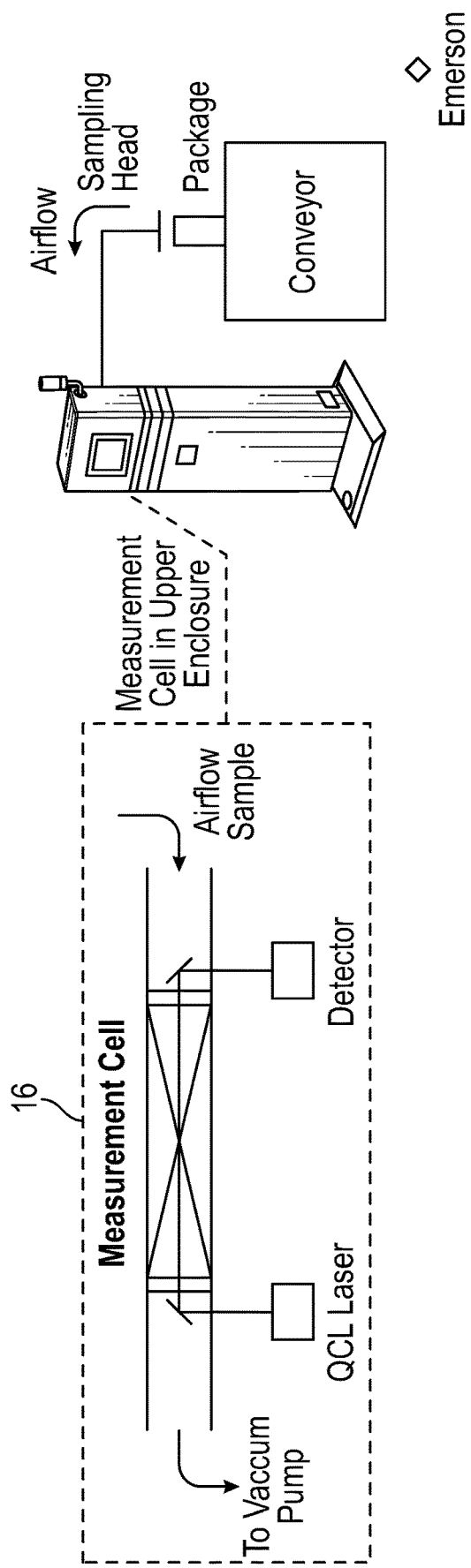
FIGS. 2(a) and 2(b) are further schematic diagrams of the leak detection system.
Figure 2B:
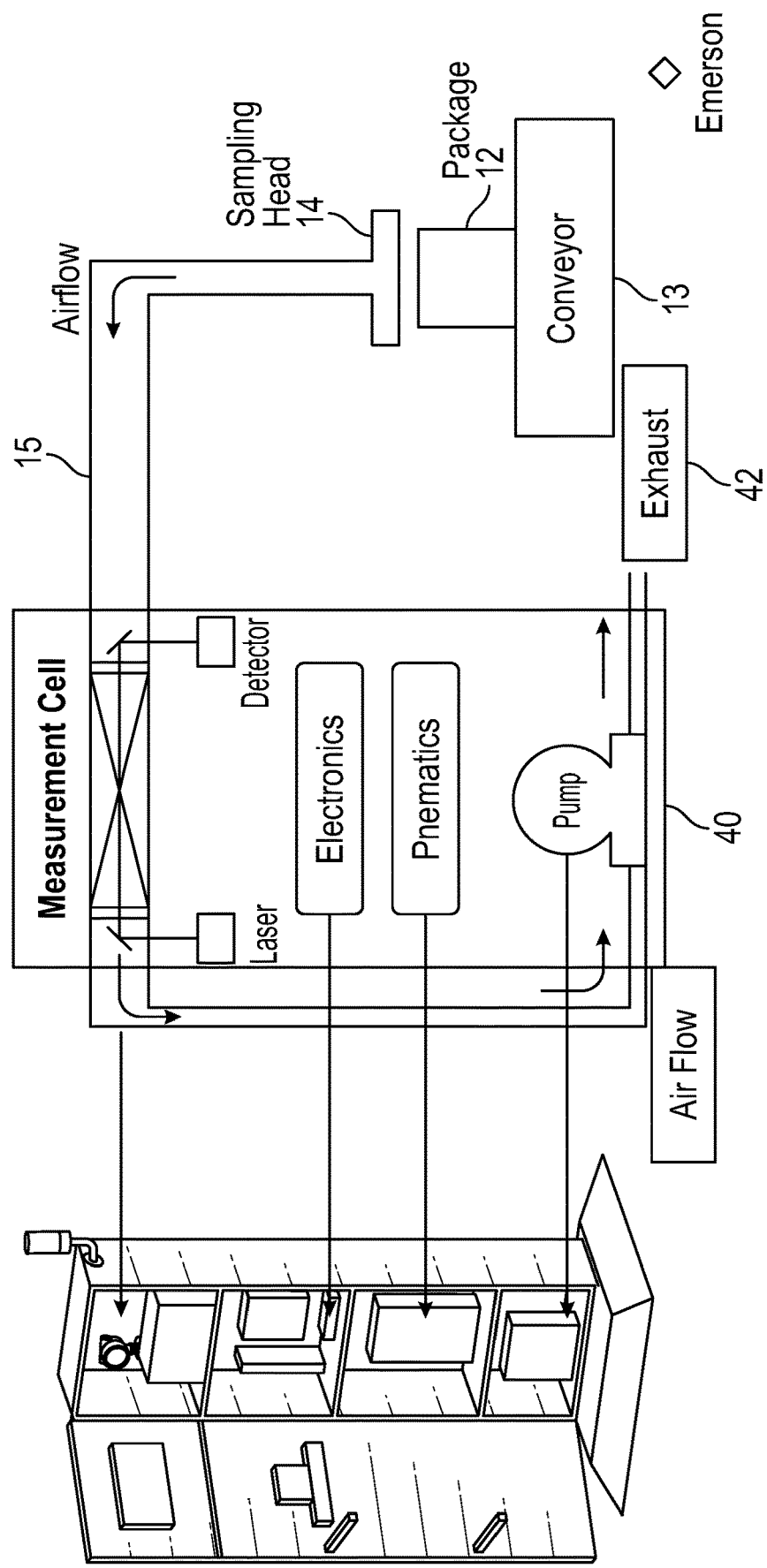

The air circuit of the system 10 is shown in further detail in FIG. 2. As part of the circuit, the sensor module 16 has a sample cell 22 that is in fluid communication with the sampling apparatus 14. The piping of air circuit 15 may be considered to form part of the air pump system 20.

As shown in FIG. 2, in the present embodiment, the sensor module 16, the controller 18 and the air pump system 20 are provided in the same housing. In other embodiments, one or more of these components is provided separately.

The system 10 is operable to move extracted gas and/or vapour from the sample region to the sample cell 22, via the air circuit 15, to be analysed. The sample cell 22 is optically coupled to a laser module 23 and to a detector module 24. Together, the sample cell 22, laser module 23 and detector module 24 are operable as a gas sensor capable of detecting the presence, absence or amount of one or more materials in the sample gas provided to the sample cell. The detector module 24 may also be referred to as a detector apparatus.

The sensor module 16 also includes steering optical components (not shown) for steering laser light from the lasers of the laser module 23 to the detector module 24 via the sample cell 22. The detector apparatus has one or more detectors that are configured to detect light from the sample cell. The light may be infra-red or visible light or light of any other suitable wavelength or from any suitable part of the electromagnetic spectrum.

The lasers are semiconductor diode lasers. A quantum cascade laser, for example, a pulse, chirped quantum cascade laser can be used. Different types of laser may be suitable for use in the system 10 for detecting different materials. As a first example, to detect $CO_2$ from packaged foods, a quantum cascade laser may be suitable. As a second example, to detect ethanol from, for example, whisky barrels and/or bottles, a tuneable diode laser and/or an inter-band cascade laser may be suitable.

The controller 18 is electronically coupled to the sensor module 16. The controller 18 has a control module 26 for providing control signal to the sensor module 16. The control module 26 is configured to provide control signals to the laser module 23 to control operation of the laser.

The controller 18 also has an air circuit control module 28 configured for controlling the pump system 20 thereby to provide air flow through the air circuit. The air circuit control module 28 controls the pump system 20 by providing electronic control signals to the pump system 20.

The air circuit module also comprises an air preparation module, which is configured to clean and remove moisture from the compressed air supply of pump system 20. The air circuit module 28 is configured to control the pump system to perform a cell purge process, which includes the step of removing debris from the sample cell.

The cell purge is a maintenance task, carried out at times when the system requires it. An alarm may be triggered based on one or more operating conditions, where the alarm is indicative that maintenance tasks, including a cell purge, should be carried out. For example, the alarm may be triggered if the pulse amplitude drops below a threshold value. Other maintenance tasks to be performed include, cleaning the mirrors and steering optics of the laser. The frequency of foreign objects reaching the cell and causing contamination varies from site to site, depending on the general cleanliness. As a non-limiting example, a pharmaceutical site may never need the cell purged or mirrors cleaned.

In the present embodiment, the sampling apparatus is mechanically coupled to the sensor module via piping of flow circuit 15. In the present embodiment, the sampling apparatus is set up to be mounted on the conveyer belt.

In some embodiments, the controller 18 may also be electronically coupled to the sampling apparatus 14 to control operation of the sampling apparatus. As described with reference to further embodiments, the sampling apparatus 14 may have a pressure apparatus that is controlled by control module 26.

In some embodiments, that have a pressure apparatus, control of the pressure applied by the pressure apparatus is performed using a precise height adjustment mechanism. In some embodiments where the sampling apparatus has a roller and the roller is made of compliant silicone which deforms around the package, application of a greater pressure may be achievable by adjusting the height of the roller such that the roller is closer to the conveyer belt. Application of less pressure may be achievable by adjusting the roller to be at a greater height so that the roller only briefly touches the container as it passed the roller. In some embodiments, the height adjustment mechanism is adjusted by a user and/or control signals via an actuator or suitable electro-mechanical device.

The controller 18 also has a signal processor 30 that is electronically coupled to the detector apparatus 24. The signal processor is configured to process signals obtained from the detector apparatus 24. The controller 18 may be, for example, in the form of a suitably programmed PC or other computer, or may comprise dedicated circuitry or other hardware, for example one or more ASICs or FPGAs or any suitable mixture of hardware and software. The control module 26 and signal processor 30 may be provided as separate, distinct components in some embodiments, for example separate processing resources, rather than being provided within the same controller component as shown in FIG. 1.

The sample cell defines a volume into which a sample of gas is introduced and collected. The gas can comprise one or more different compounds of interest. An indication of the presence of these compounds in the gas collected in the sample cell can be determined by passing light from the laser module 23 through the sample cell 22 and by detecting the laser light using the detector module 24. If the light is in a wavelength range that corresponds to the absorption spectrum or absorption lines of the compound of interest, then any absorption of light as it passes through the cell may be due to the presence of the compound of interest in the sample. The level of absorption, once determined, can be used to determine a physical property of the compound of interest in the sample, for example, concentration. As different compounds have absorption spectra at different wavelength, in some embodiments, it may be desirable to provide different wavelengths of light to the sample cell 22.

The determined level of absorption may be determined relative to a background measurement. In some embodiments, the background measurement is an average background measurement. In the present embodiment, the average background measurement is updated with each container that is tested to provide an up-to-date background measurement. The background measurement is a measurement of the ambient air that is sampled through the system.

Following the indicated path of air flow around the air circuit 15 shown in FIG. 1, the sampling apparatus 14 is connected, via piping, to the sample cell 22. At a point in the piping between the sampling apparatus 14 and the sample cell 22 a filter (not shown) is provided. The filter provides a protective barrier to prevent the passing of objects that have entered the air circuit that may damage equipment further on in the air circuit. The sample cell 22 provides an enclosed volume in which air or gas or vapour can be analysed using the gas sensor.

Continuing on the indicated path of air flow around the air circuit 15, the sample cell 22 is connected to the pump 40 by further piping. The pump 40 draws air through the air circuit 15 and into the sample cell 22 of the sensor thereby creating an air flow in the air circuit 15. The terminating point of the air circuit 15 is an exhaust 42.

In some embodiments, the system 10 has one or more air pump(s) that are provided as part of the air pump system 20 for moving air from the sampling region through the sample cell which are provided at other locations on the air circuit 15. In some embodiments, a further pump is provided, as part of the air pump system 20, in the sampling apparatus 14 that can be controlled by controller 18. In such an embodiment, the controller, for example, the air circuit control module 28, is electronically connected to the further pump of the sampling apparatus.

In the present embodiment, the air pump system 20 has an air pump configured to suck air through air circuit 15 therefore to allow gas and/or vapour at the sampling region to be collected by the sampling apparatus 14. The air pump is configured to draw air through air circuit 15. It will be understood that other pneumatic systems for providing suction at the sampling apparatus can be used.

In use, container 12 is provided at the sample point and the system performs a sampling process on the container which includes collecting gas by the sampling apparatus 14 from the sample region about the container. The sampled gas is then drawn, via air circuit 15, from the sample region to the sample cell 22. One or more laser beams are produced by laser module 23 and introduced into sample cell 22. The laser beams pass through the sample cell and the sample contained within the sample cell and are detected by the detector module 24. A detection signal is sent to signal processor 30 for processing. By processing the detection signal, the presence, absence or amount of one or more materials in the sample of gas can be determined.

In the case that the container 12 is leaking gas, vapour or liquid, for example, through one or more breaches in the outer surfaces of the collected gas and/or vapour may include one or more materials of interest, the presence of which can be determined by sensor module 16 and controller 18.

Following the sensing process, the sample of gas is drawn, via the air circuit, to the terminating point of the air circuit (the exhaust 42).

The drawing of samples from sample region to the exhaust via the sample cell is a continuous process. Following the exhaust of the sample from the sample cell, the system is then ready to receive and perform the sample process on a further container on the conveyer belt of conveyer belt system 13.

FIG. 2(*a*) and FIG. 2(*b*) are further schematic diagrams showing the system 10. FIG. 2(*a*) and FIG. 2(*b*) show further detail of the sensor module 16. In the present embodiment, the sample cell 22 is a Herriot cell or modified Herriot cell. FIG. 2(*b*) also shows further detail of circuit providing airflow through system 10. As discussed above, the air circuit is provided by piping between the sampling apparatus and the sample cell and further piping between the sample cell 22 and a pump 40 and further piping between the pump 40 and an exhaust.

As shown in FIGS. 2(*a*) and 2(*b*), the sample cell, controller and pneumatic system are enclosed in a housing. In the present embodiment, the measurement cell is provided in an upper enclosure of the housing and the electronics and pneumatics are provided in a lower enclosure.

Figure 3A:
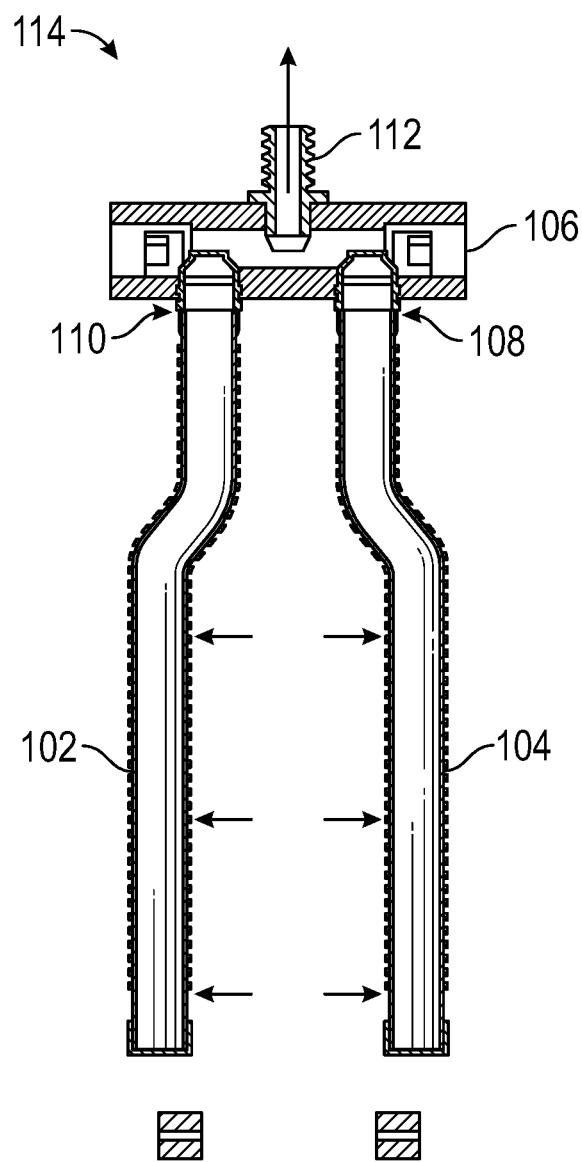
FIG. 3(a) shows a front view of a first sampling apparatus in accordance with embodiments.
Figure 3B:
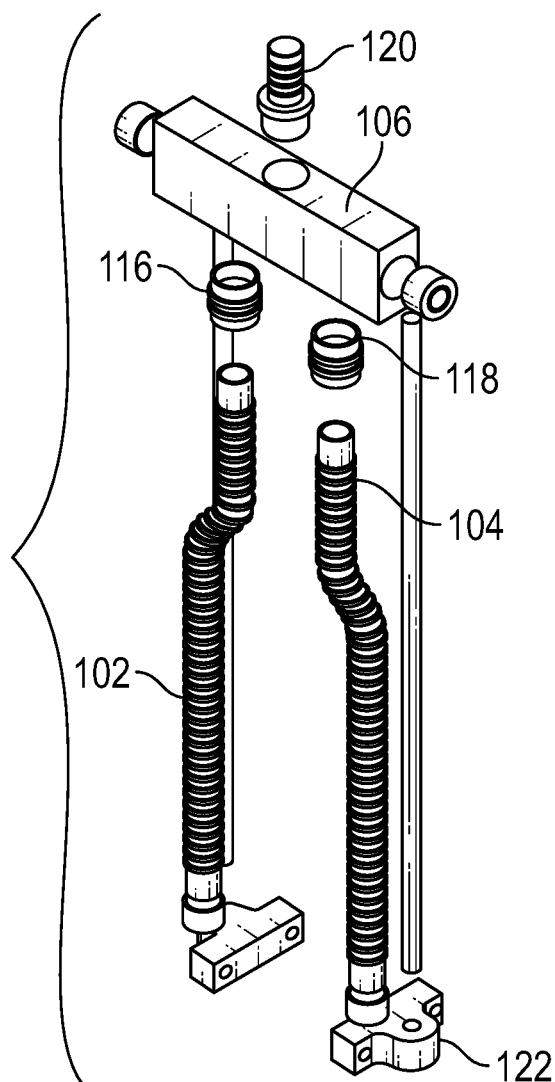
FIG. 3(b) is a perspective view of the first sampling apparatus in a disassembled configuration and FIG. 3(c) shows the first sampling apparatus from a front elevation in use with a rigid container.
Figure 3C:
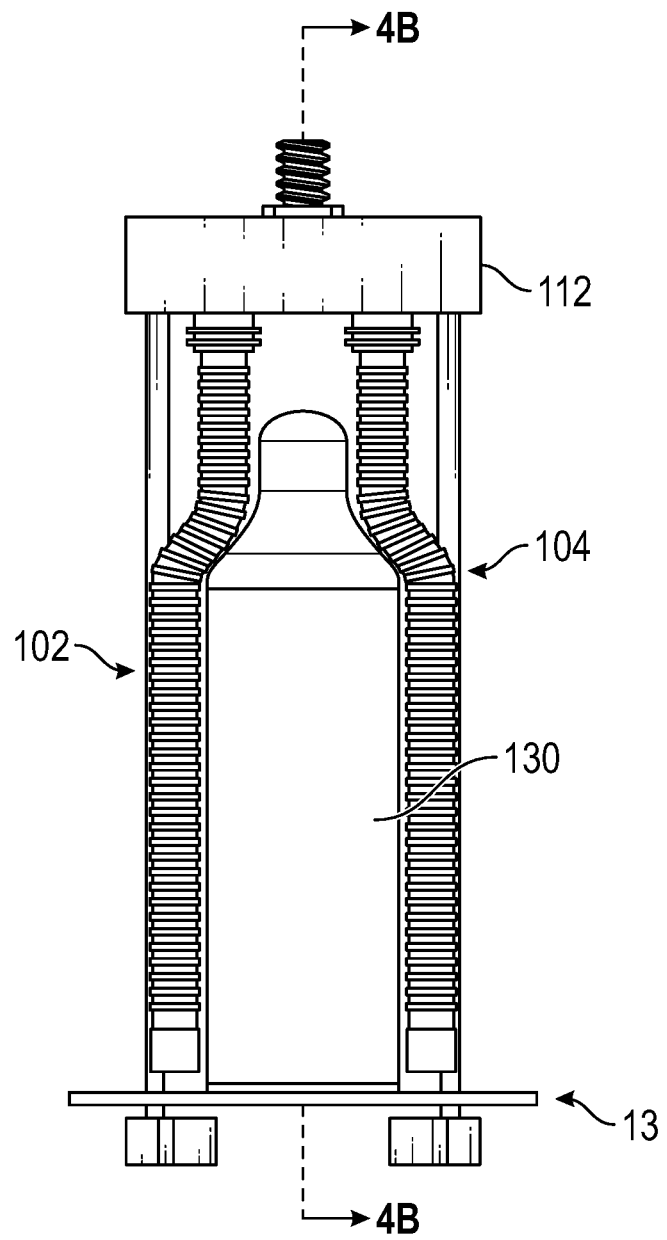
Figure 4C:
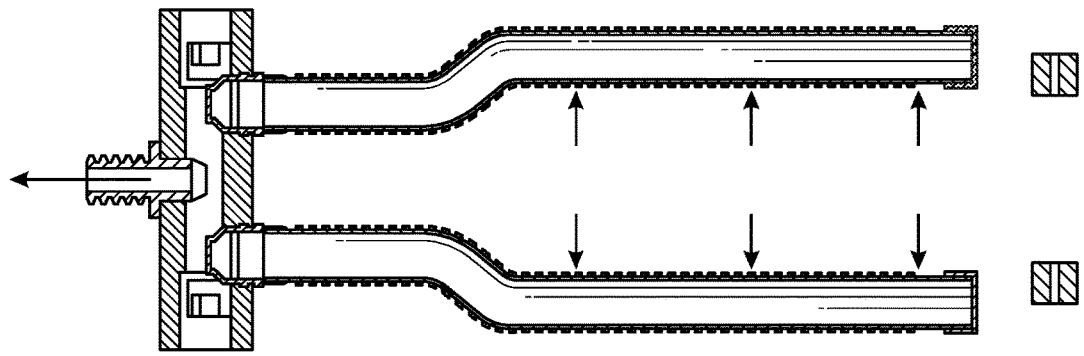
FIGS. 4(a), 4(b), and 4(c) show further views of the first sampling apparatus.
Figure 4B:
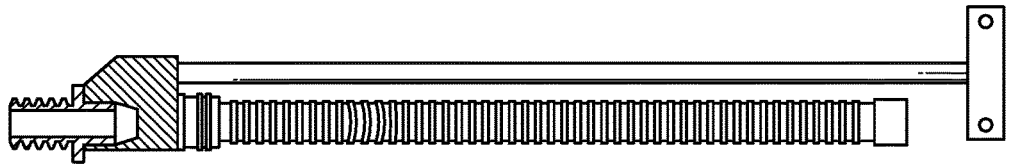
Figure 11:
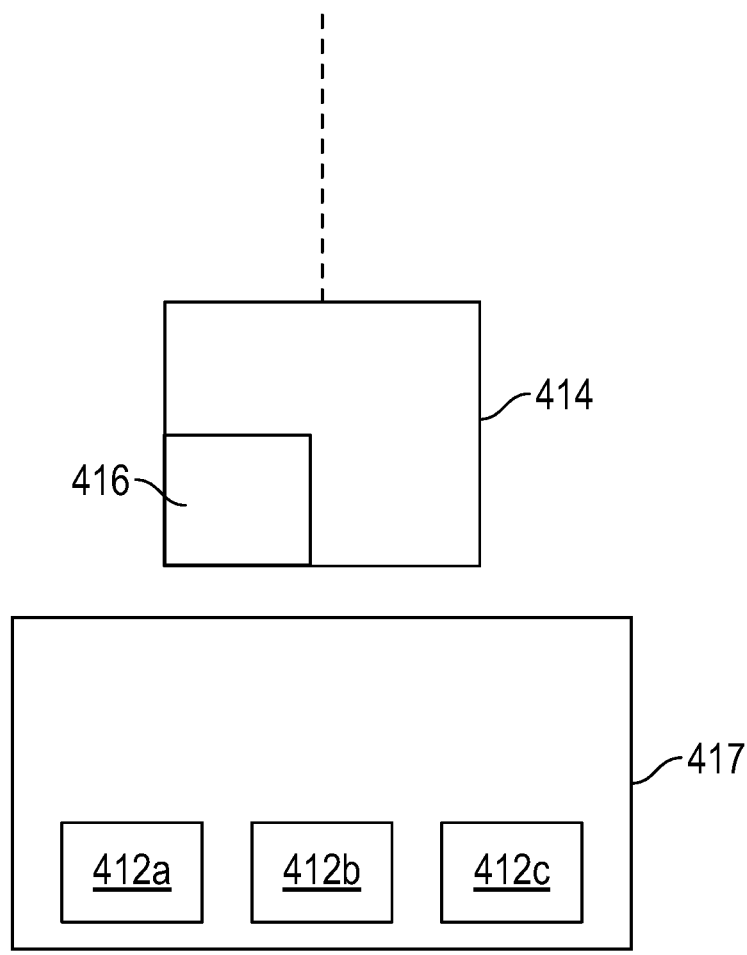
FIG. 11 is a schematic diagram of a fourth sampling apparatus in accordance with further embodiments.

In the following, different aspects of sampling apparatus 14 are discussed. It will be understood that the following described sampling apparatuses are configured to be used with the system described with reference to FIGS. 1 and 2, in place of sampling apparatus 14. In some embodiments, the sampling apparatus 14 is a contact apparatus, such that, in use, the sampling apparatus 14 or part thereof applies pressure thereby to extract a sample of gas for testing. These may be referred to as contact sensors. In other embodiments, the sampling apparatus 14 is a non-contact apparatus such that, in use, the sampling apparatus 14 does not contact and/or does not apply pressure. These embodiments are referred to as non-contact sensors. FIGS. 3, 4 and 5 illustrate embodiments of non-contact sampling apparatuses, in particular, a first and a second non-contact apparatus. FIGS. 6 to 11 show contact sampling apparatuses, in accordance with embodiments. In particular, FIGS. 6 to 10 shows a contact sampling apparatus configured to apply pressure directly to the container and FIG. 11 shows a contact sampling apparatus configured to apply pressure to further packaging containing the container.

Turning to the first non-contact sampling apparatus, FIG. 3(*a*) shows a sampling apparatus 114 in an assembled configuration. FIG. 3(*b*) shows the same sampling apparatus 114 in a dis-assembled configuration. It will be understood that sampling apparatus 114 is configured to be used as part of the detection system 10 described with reference to FIGS. 1 and 2, in particular, in place of sampling apparatus 14.

The sampling apparatus 114 has a first sampling member 102, a second sampling member 104 and a sample bar 106. In the present embodiment, the sample bar 106 is substantially horizontal. The first and second members 102, 104 are attachable to the sample bar 106 such that, when attached, they hang suspended from the sample bar.

The first and second members 102, 104 each comprise a hollow conduit. The conduits extend along the length of the sampling members 102, 104. Each of the first and second members 102, 104 comprise a plurality of inlets on their surface to allow air or other gas to enter its hollow conduit (the air-flow into the inlets is indicated by the inward facing arrows in FIG. 3(*a*)). The inlets may be referred to as sample inlets. The sample bar 106 comprises a manifold providing a hollow chamber with a first and a second inlet 108, 110 and an outlet 112. The first and second members 102, 104 are attachable to the sample bar 106 at the first and second inlet thereby placing the conduits of the sample members and the manifold in fluid communication. The outlet 112 of the manifold allows the sampling apparatus to be connected to the detection system, via piping, a described with reference to FIG. 1 and FIG. 2. When sampling apparatus 114 is connected to the detection system, the air conduits of the sampling members 102, 104 provide entrance points to the air circuit 15.

First and second connectors 116, 118 (shown in FIG. 3(*b*)) are provided to connect and secure the sampling members 102, 104 to the sample bar at first and second inlets 108, 110. A third connector 120 is provided to connect the sample bar, at the outlet 112, to further piping of detection system. As shown in FIG. 3, in the present embodiment, the first and second sample members do not fully extend to the conveyer belt, however, it will be understood that these sample members may, in other embodiments, extend to the conveyer belt.

The sample bar 106 can be connected to the first and second members 102, 104, using connectors 116, 118 at the first and second inlet 108, 110, so that, when connected, the conduits of the first member are in fluid communication with the manifold and the conduit of the second member is in fluid communication with the manifold. The upper sample bar can be connected at the outlet 112, to the air circuit 15 using connector 120.

Sampling apparatus 114 also has a mounting assembly 122 for mounting onto either side of the conveyer belt. When assembled and mounted to the conveyer belt, the sampling apparatus sits above the conveyer belt. When mounted to the conveyer belt, the first and second member 102, 104, part of the sample bar 106 and the conveyer belt form a gap through which a container, carried by the conveyer belt, can pass through.

In some embodiments, a height adjustment mechanism is provided allowing the height of the sampling apparatus 114, in particular the sample bar 106, when mounted on the conveyer belt, to be adjusted.

In some embodiments, a width adjustment mechanism is provided allowing the width of the sampling apparatus, in particular, the width between sampling members 102 and 104, when mounted to the conveyer belt, to be adjusted. In the present embodiment, a width between sampling members 102, 104 can be adjusted by bending the sampling members 102, 104. In other embodiments, a width adjusting mechanism is provided that is controllable by control signals.

The mounting assembly comprises securing means for securing the mounting assembly to the conveyer belt. The mounting assembly further comprises two support bars for supporting the sample bar 106 at a height above the conveyer belt.

The first and second members 102, 104 are shaped or contoured to correspond to the shape of the container that to be tested. The first and second members extend along the height of the bottle. In this embodiment, the shape of the first and second members 102, 104 are configured to correspond to the shape of a bottle. This is shown in FIG. 3(*c*), where bottle 130 is shown.

In the present embodiment, each sample member has many inlets, however it will be understood that more inlets may be provided. In some embodiments, a plurality of inlets are distributed along the length of the sampling members 102, 104. In some embodiments, the distribution of inlets is uniform, in other embodiments, the distribution is such that inlets are more concentrated at certain points of the bottle, for example, at the neck and/or at a sealed part and/or at a part that is more likely to break. In some embodiments, sample inlets are also provided on the sample bar.

In the present embodiment, 25 inlet holes are provided on each sample bar, therefore 50 inlet holes in total. It will be understood that the number of inlet holes on each sample bar can be varied.

In the present embodiment, the inlet hole sizes are different. The inlet hole sizes of the plurality of sample inlets are staggered along the length of the sampling member 102 to produce even suction along the length of the sampling members 102, 104. The inlet hole sizes are selected to provide an even distribution of suction along the length of the container.

FIG. 3(*c*) shows the sampling apparatus 114 in use with a bottle 130. As illustrated in FIG. 3(*c*), the first sampling member 102 and the second sampling member 104 both have a shape that complemented the shape of the bottle. The two members 102, 104, together with the sample bar 106 and the upper surface of conveyer belt of conveyer belt system 13, form an aperture that has a profile that substantially corresponds to the shape of the bottle 130 under test. The formed aperture is shaped and has a size such that, in use, the bottle can pass along the conveyer and through the aperture without making substantial contact with the members. In the present embodiment, the formed aperture is such that the bottle 130 can pass under the sampling apparatus, on the conveyer belt, without touching the sampling members or any other part of the sampling apparatus.

In the present embodiment, the sampling apparatus is shaped such that, during the sampling process, as the bottle passes underneath the sampling apparatus, the bottle comes within a distance of 20 mm of the sample inlets of the sampling members 102, 104. As the bottle passes the sampling apparatus on the conveyer belt the surface of the bottle passes within 20 mm of the sampling members.

While a specific distance is described between container and sample inlets, it will be understood that the distance may be varied, by adjusting the sampling members, to provide good sensitivity. In some embodiments, the sample head is positioned such that the container comes within 1 cm of the sample head. In some embodiments, the sample head is positioned such that the container comes within 50 mm of the sample head.

In some embodiments, one or more guiding elements are provided on the conveyer belt to align the bottle with the sampling apparatus.

In the present embodiment, the distance between subsequent containers being tested on the conveyer belt is sufficient to allow each container to be tested and counted individually. In the present embodiment this distance is greater than 20 mm, however, it will be understood that the distances used may vary for different containers, and, for example, different speeds of conveyer belt.

Each sample member has a plurality of air inlets to allow air or other gas or vapour into the air circuit of the detection system that has been described with reference to FIGS. 1 and 2. The air inlet may also be referred to as sample inlets. The plurality of inlets are distributed along the length of each sampling member 102, 104 and are inward-facing so that the inlets are proximate to the surface of the bottle as it passes underneath the sampling apparatus. The sample inlets are distributed about the bottle so that, during the sampling process, the sample region, from which the sample is collected, surrounds substantially all of the exposed portion of the bottle. In some embodiments, the sample region surrounds an upper portion of the rigid container, for example, the bottle neck. In some embodiment, the sample region extends along a length and/or width of the bottle.

In the present embodiment, the members are formed from deformable piping that allows the members to be deformed to the shape of the container to be sampled. When secured, the deformed members retain their shape, in particular, the members retain their shape during the sampling process. While deformable members are described above, in other embodiments the members may be rigid and/or non-flexible and/or non-deformable.

In the present embodiment, the sample bars are deformable. The deformable member can be deformed into the desired shape in order to match a shape of at least part of the rigid container, in this case, the bottle, and/or to minimize a gap between the plurality of sample inputs and at least part of a surface of the bottle during the sampling process.

In use, a bottle is conveyed by conveyer belt of conveyer belt system 13 and passes underneath the sampling members 102, 104, and through the aperture. As the bottle passes underneath the sampling members, a sampling process is performed, such that air from a sampling region is drawn, via the air inlets of the sampling members 102, 104, to the sample cell 22. The collected sample of gas or vapour is then tested for the presence of one or more materials, as described with reference to FIGS. 1 and 2.

In the present embodiment, the sampling members 102, 104 extend in the direction of the height of the bottle under test, and the sample inlets are distributed along this direction. The conveyer belt acts to move the sample inlets in a different direction, that is, in a direction orthogonal to the height of the bottle. By distributing sample inlets along the height of the bottle under test and moving the bottle in an orthogonal direction, the sampling apparatus performs a scan at least part of the surface of the bottle when it is conveyed past the sample head. Scanning over the surface may be useful for detecting leaked liquid present on the surface of the bottle. Considered together, first sample member 102 scans a first side of the bottle and second sample bar 104 scans the other side of the bottle simultaneously.

Figure 4A:
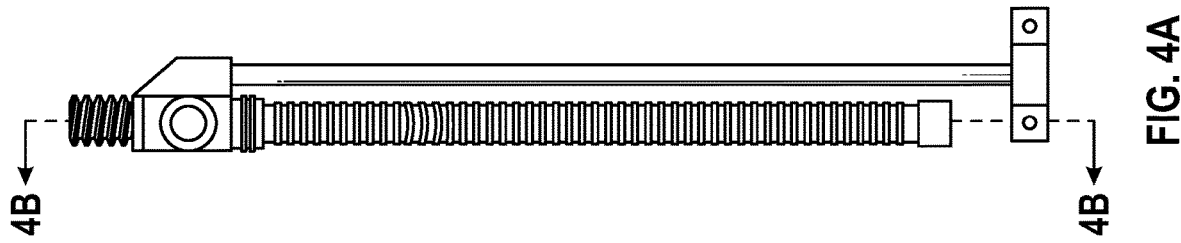
Figure 5:
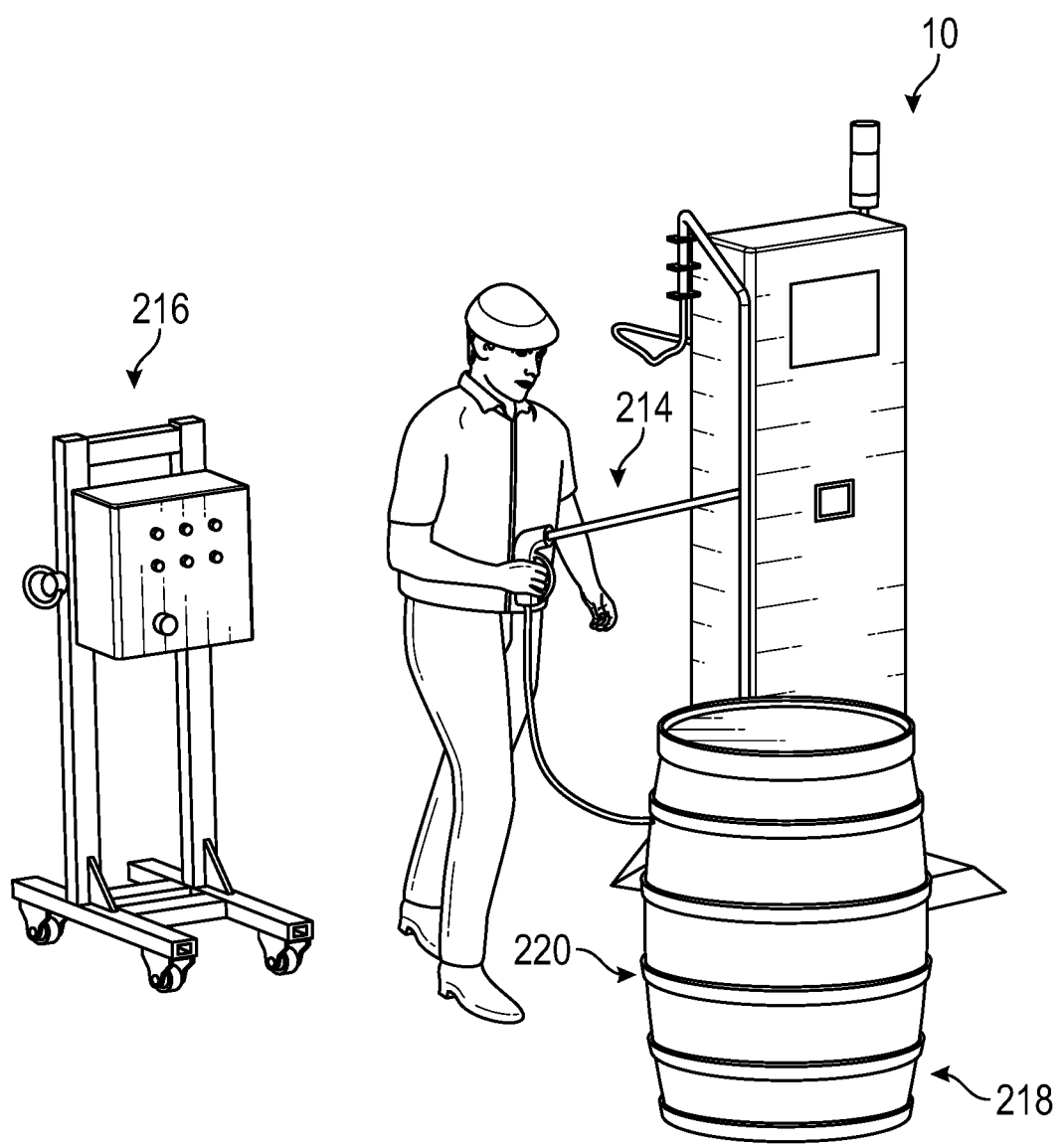
FIG. 5 shows a second sampling apparatus in accordance with further embodiments.

FIGS. 4(a), (b) and (c) show further views of the sampling apparatus 114.

Although in the above described embodiments, first sampling apparatus 114 is described as being bottle-shaped, it will be understood that other shapes are possible. For example, an archway or a rectangular sampling apparatus may be provided.

Different shapes for different containers are used. The shapes can be sized and matched to the container. For testing boxes that contain bottles of whisky, a large, box-shaped archway that is sized to fit over box may be used.

In FIG. 5, a further sampling apparatus 214 in accordance with further embodiments, is shown. Further sampling apparatus 214 is hand operated and suitable for use with detection system 10. The hand operated sampling apparatus 214 may be used for sampling air and/or vapour on larger objects, or objects with non-uniform or irregular shapes. In this embodiment, the sampling apparatus 214 is a manually operated sampling apparatus 214 that is connected to the sensor module by flexible hosing. The sampling apparatus is operable by hand, such that a user can move the sampling apparatus over the surface of the container.

The further sampling apparatus 214 has a nozzle allowing the user to control the position of the sampling region where gas or vapour is collected from. The further sampling apparatus 214 also has a further gas source for providing, for example, a dopant gas and gas source piping for allowing a user to provide the further gas to a container.

In the present embodiment, the container is a barrel 218. The barrel 218 has an opening 220. A modified bung is provided that is sized to fit into opening 220 such that the modified bung seals the barrel 218. The modified bung also has pipework that is connectable to gas source piping allowing the reference gas source to be provided to the inside of the barrel 218 when the modified bung is in place. In the present embodiment, the pipework is a small diameter pipe.

In use, a user positions the modified bung at barrel opening 220. When positioned at the opening 220, the user can provide reference gas to the inside of the barrel via the reference gas piping and modified bung, thereby filling the barrel with the reference gas. By filling the barrel with reference gas the barrel can be pressurised.

The user can then test for structural defects of the barrel 218 by moving the hand held sampling apparatus 214 over the surface of the barrel 218. The pump of the laser detection system continuously sucks air from the end of the nozzle and thus the sample chamber receives sample gas from different sample points on the outer surface of the barrel. The gas is then tested for one or more components by the gas sensor, as described above.

By moving the hand-held sampling apparatus over the barrel, a user can control the sample region from which a sample is collected.

In some embodiments, the hand-held sampling apparatus comprises a sample bar with a plurality of inlet holes, as substantially described with reference to sampling member 102, as described with reference to FIG. 4. In particular, the sampling member may be shaped and have a plurality of inlet holes distributed along its length.

Empty barrels can be tested for leaks prior to being filled with liquid. This may prevent wastage from defective barrels. For example, some distilled spirits are stored for long periods of time (for example, whisky which is aged for at least three years). Therefore any defects in barrels may be wasteful. The reference gas can be any suitable gas. Compressed air or CO2 may be used. For new or dry barrels, CO2 is used as the reference gas.

Barrels that are not empty may also be tested. For barrels filled with distilled spirits, the system can be configured to detect for ethanol. Barrels that have been used but are wet may also be tested for ethanol that has soaked into the wood of the barrel.

Detection results can be collected and later analysed. In the present embodiment, an alarm or other indicator is activated on detection of the reference gas so that a user can locate the source of any structural defects. Leaking containers may be rejected, for example, by providing means to physically remove them from the conveyer belt line. Such means can be a jet of compressed air or another device for moving the container off the conveyer belt.

While barrel testing is described with reference to a hand-held sampling apparatus, it will be understood that in further embodiments, barrel testing can also be performed in-line, for example, on a conveyer belt system.

In such further embodiments, a non-contact sampling apparatus suitable for use with barrels and similar to the sampling apparatus 114 is provided. The barrel sampling apparatus has one or more sample members curved to match the curve of the outside of the barrel.

In the embodiments described with reference to FIG. 5, the user operates the sampling apparatus 214 by hand. In further embodiments, the barrel is placed on a rotating conveyer belt such that at least part of the barrel passes by the sample head as it rotates. The sample head is curved to match the shape of the barrel. The sample head thus scans over the surface of the barrel as the barrel rotates.

In FIGS. 6 to 9, a further sampling apparatus 314 suitable for use with detection system 10 in accordance with further embodiments is illustrated. In contrast to other embodiments, in particular to the non-contact sampling apparatus of FIG. 3, the further sampling apparatus 314 is referred to as a contact sampling apparatus 314.

Figure 6A:
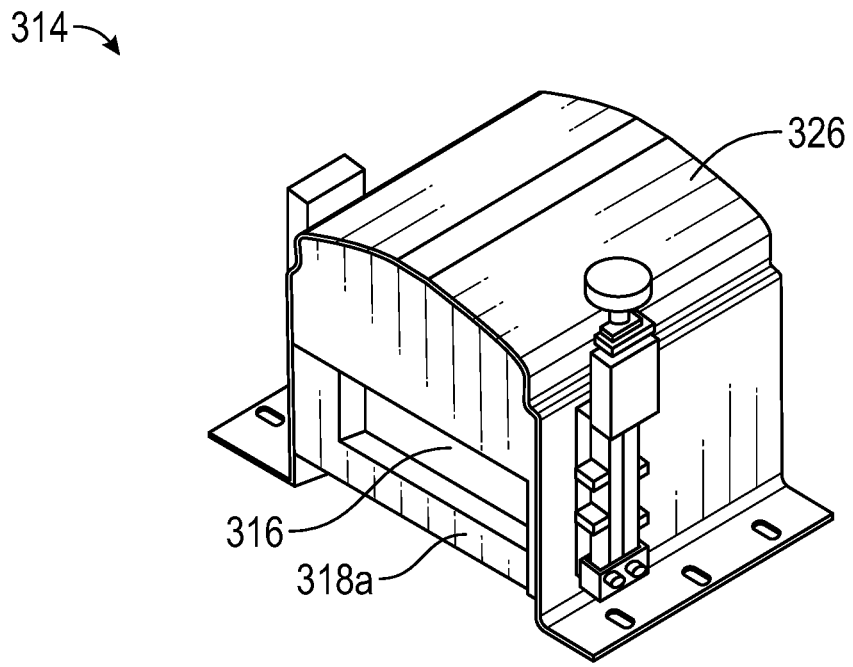
FIG. 6(a) and FIG. 6(b) are perspective views of a third sampling apparatus in accordance with further embodiments.
Figure 6B:
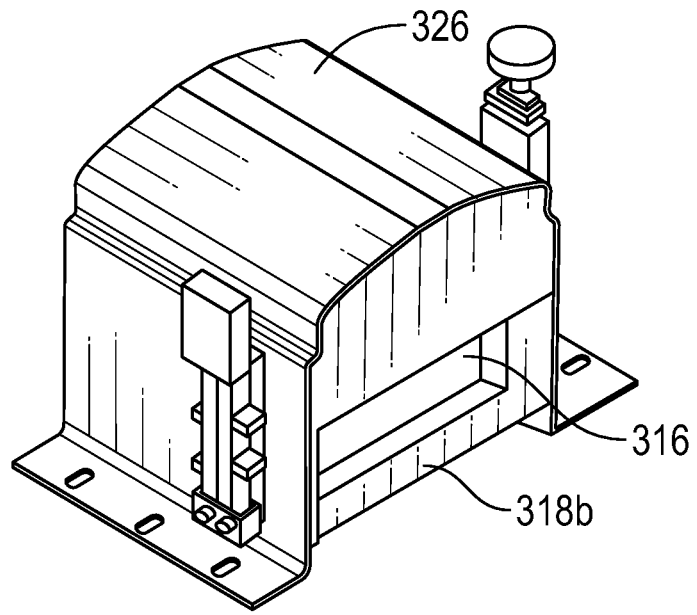
Figure 7:
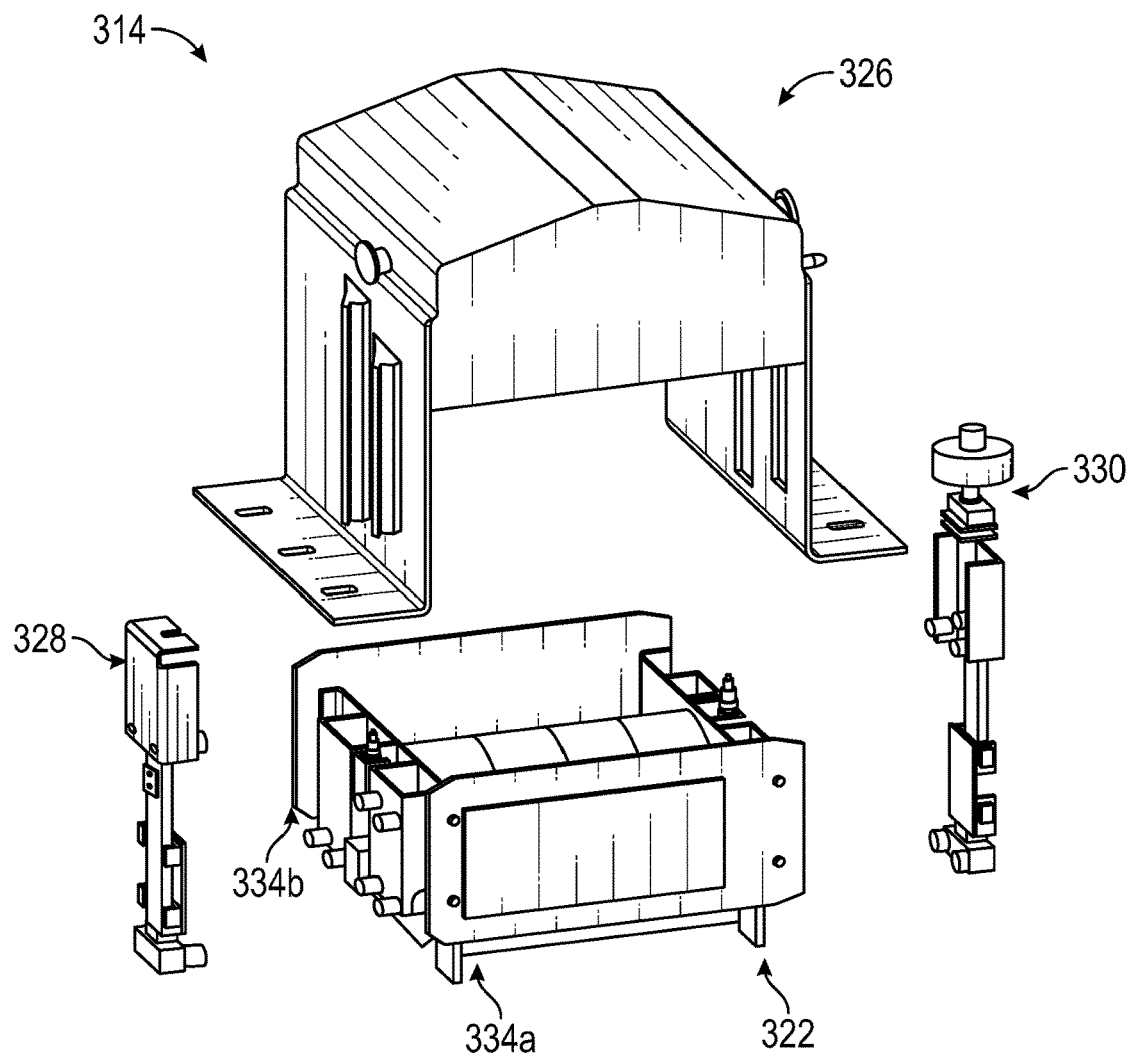
FIG. 7 is a perspective view of the third sampling apparatus in a disassembled configuration.
Figure 8:
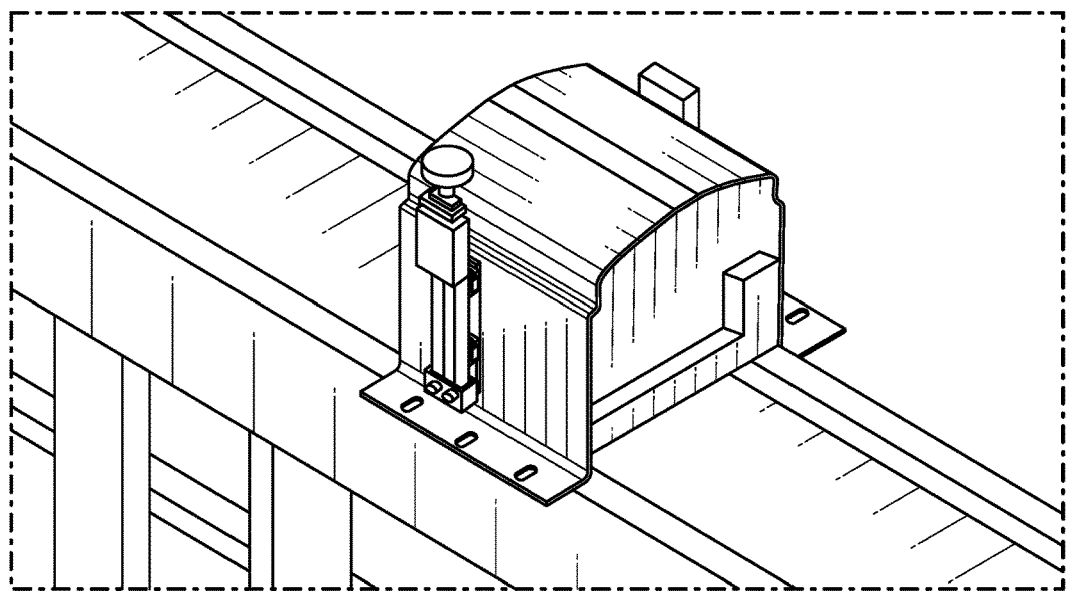
FIG. 8 is a perspective view of the third sampling apparatus mounted to a conveyer belt.
Figure 9:
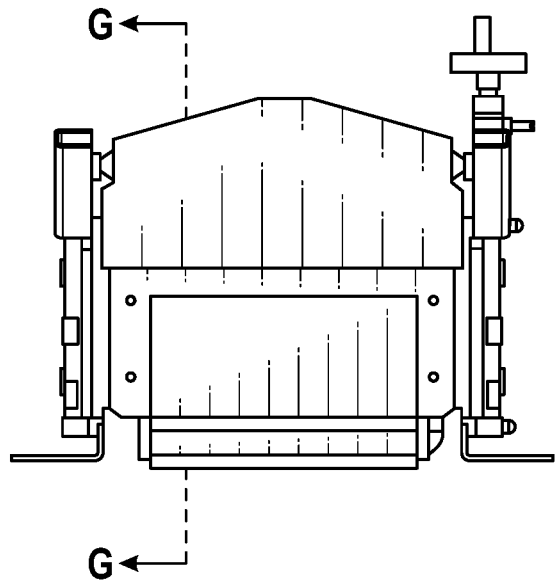
FIG. 9 shows side elevation views of the third sampling apparatus.
Figure 9:
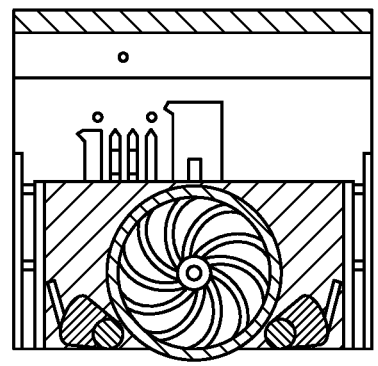
Figure 9:
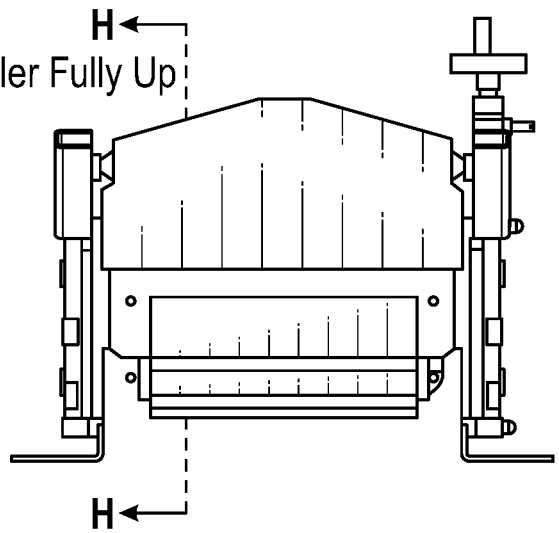
Figure 9:
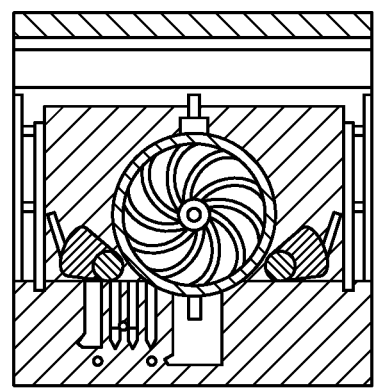
Figure 10:
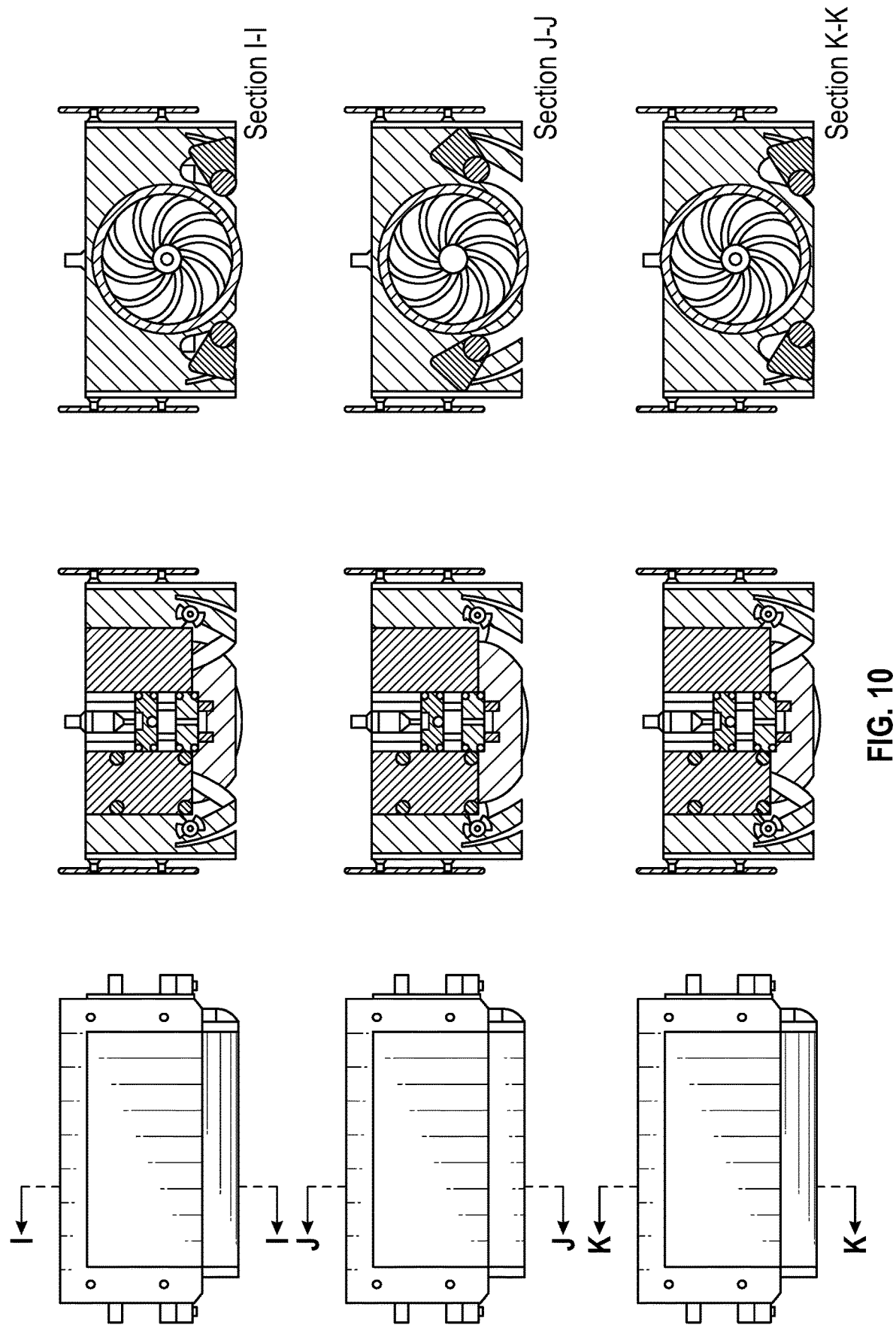
FIG. 10 shows further side elevation and cross-sectional views of the third sampling apparatus.

FIG. 6(a) is a first view of the contact sampling apparatus 314 from a first perspective and FIG. 6(b) is a second view of the contact sampling apparatus 314 from a second perspective. FIG. 7 shows a perspective drawing of the contact sampling apparatus 314 in a dis-assembled configuration. FIG. 8 shows the contact sampling apparatus mounted on a conveyer belt. FIG. 9 shows a side view of the contact sensor in an assembled configuration from a first and second viewpoint.

It will be understood that the contact sampling apparatus 314 is configured to be used with detection system 10, in particular, in place of sampling apparatus 14. In contrast to the non-contact sensors described above, contact sampling apparatus 314 has pressure apparatus for applying a pressure to the container. In this embodiment, the pressure apparatus comprises a roller 316. The roller 316 provides a rotational force to the container, as the container is conveyed past the roller. In other embodiments, other pressure apparatuses are used, for example, a pressing member for applying a linear force to the container.

When mounted and secured to the conveyer belt, the roller 316 sits in an elevated position above the conveyer belt such that the container can pass, on the conveyer belt, beneath the roller. The height of the roller can be adjusted up or down thereby to change the distance between the roller 316 and the conveyer belt. The roller 316 is positioned such that, as the container passes beneath the roller 316, the roller makes contact with the upper surface of the container. As the container moves beneath the roller 316, the roller will rotate thereby applying pressure to different points across the upper surface of container. By making contact, the roller 316 applies a pressure to the container, so that, if there are any structural defects in the container, for example, holes or breaches, gas or vapour from inside the container is expelled out from the container.

On either side of the roller there is provided first and second sampling members 318a, 318b. The first and second sampling members may be referred to as first and second sampling heads. The first and second sampling members are configured to collect gas from a sample region about the container. When contact sampling apparatus 314 is mounted on the conveyer belt, the sampling members 318a, 318b are provided at an elevated position above the conveyer belt. The height of the sampling members above the conveyer belt is sufficient to allow the container to be tested to pass under the sample members without making contact.

The sampling members are provided parallel to each other, the first sampling member 318a at a first sampling position and the second sampling member 318b at a second sampling position, such that the roller 316 is provided between the first sampling position and the second sampling position. The contact sampling apparatus 314 has piping such that the sampling members can be connected to the system 10, such that the sample members are in fluid communication with the air circuit 15.

In use, the system is configured to take two samples per container that pass through the sampling apparatus. A first gas sample is collected using the first sampling member at the first sampling position (before pressure is applied) and a second sample using the second sampling member (after pressure is applied).

By sampling at more than one sampling position, fuller coverage of the container under test may be provided. By sampling at more than one sampling positions, the possibility of missing leaks from leading or trailing edges of packages may be reduced.

In the present embodiment, the roller 316 and sampling members 318a, 318b are provided as part of a roller carriage 322, as illustrated in FIG. 7. FIG. 7 shows a perspective drawing of the contact sampling apparatus 314 in a dis-assembled configuration. The roller carriage 322 is held in place by a first and second adjustable mounts 328, 330. A user can adjust the height of the roller carriage 322, and thus the height of roller 316 and sampling heads 318a, 318b using adjustable mounts. The roller carriage 322 also has a structure that partially surrounds the roller and sample head. In particular, the roller carriage has a first and second screen 334a, 334b provided on either side of the roller.

By partially surrounding the container during the sampling process, background gas in the sample may be reduced, which may improve the sensitivity of the system.

An outer housing 326 is also provided that fits over the roller carriage 322. The outer housing 326 and first and second screen of the roller carriage 322 co-operate to provide an enclosure for the roller carriage 322. When mounted on the conveyer, as shown in FIG. 8, the outer housing 326, the first and second screen 334a, 334b of the roller carriage 322 and the conveyer belt provide a volume with an entrance on the conveyer belt for receiving the container and an exit for that container. The volume is partially enclosed by the combination of outer housing 326, roller carriage 322 and conveyer belt.

The outer housing 326 also provides guiding members for receiving the adjustable mounts 328, 330. The roller carriage 322 can be raised or lowered by moving the adjustable mounts up and down the guiding members and securing them at the desired height. It will be understood that in other embodiments, other suitable adjustment mechanisms may be used to raise or lower the height of the roller and/or sample members.

FIG. 9 shows a selection of perspective and cross-sectional views of the roller head carriage. In the above described embodiment, the roller carriage 322 is described as moveable and therefore the roller and sample heads are also moveable together. In the present embodiment, the sampling members 318a, 318b are mounted to the roller carriage 322 via further adjustable mounts so that the position of the sample heads may be adjustable separately from the roller. This is shown in FIG. 9, where the roller 316 is maintained in the same position and the sampling heads 318a, 318b are adjusted relative to the roller. In some embodiments, the first sampling head 318a is adjusted to be at a first height, the second sampling head 318b is adjusted to be at a second height and the roller 316 is adjusted to be at a third height.

In the above described contact sample head embodiments, the pressure apparatus, for example, the roller 316, applies pressure directly to the container being tested. In other embodiments, the sampling apparatus is configured to apply pressure indirectly to the container.

In some embodiments, the roller is manufactured out of food grade silicone or urethane.

Applying pressure or contact directly to a container 12 as part of a sampling process may not be desirable for certain types of containers, for example, rigid containers.

FIG. 11 is a schematic diagram of a sampling apparatus 414 in which pressure is applied indirectly to a rigid container to obtain a sample of gas or vapour from a container. It will be understood that sampling apparatus 414 can used with the system described with reference to FIGS. 1 and 2, in particular in place of sampling apparatus 14. The sampling apparatus 414 is provided that is in fluid communication with the air circuit, as described with reference to FIG. 1.

The sampling apparatus 414 has a pressure applying member 416. Pressure applying member 416 may be referred to as a pressure apparatus. In contrast to embodiments described above, the container under test is provided in further packaging 417. In the present embodiment, a plurality of containers to be tested are provided in the further packaging 417. The plurality of containers are indicated by reference numerals 412a, 412b, 412c. The further packaging is provided on conveyer belt of conveyer belt system 13. The further packaging 417 is non-rigid and has one or more breaches, for example holes or gaps, that allows air or gas to escape the packaging in response to the application of a force to the further packaging. The further packaging may be a cardboard box.

In the present embodiment, the plurality of containers 412a, 412b, 412c are sealed bottles holding alcoholic drinks and the further packaging is a box for holding and transporting said bottles. In the present embodiment, the rigid container is sealed or closed to for at least one of: prevention of tampering, preservation of contents, prevent leakage or for hygiene purposes.

While it is described for use with rigid containers, it will be understood that the embodiment shown in FIG. 11 can be used for other non-rigid containers that are provided in further packaging.

In use, a pressure or force is applied by pressure applying member 416, for example, to the upper surface of the further packaging 417 and a sample of gas is extracted from the further packaging 417 via one or more gaps or holes. If the container is leaking, then any leaked gas or vapour that has previously accumulated inside the packaging is extracted by application of the pressure. The extracted gas or vapour is then moved to the sample cell to be tested, as described above.

As described with reference to previous embodiments, the sampling apparatus 414 may be used together with a conveyer belt of conveyer belt system 13 for conveying the further packaging 417.

The present embodiment may be useful for detecting leaking or broken bottles in a box, for example, before the further packaging is stored. In the case of a cardboard box, a leaking or broken bottle will wet the cardboard and may cause the cardboard box to collapse.

It will be understood that the pressing member, can be any member that can apply pressure or force to the packaging. In one embodiment, one or more pressing members are provided on the conveyer belt to squeeze the further packaging as it passes the sampling apparatus. In other embodiments, one or more rollers are provided to apply pressure. In particular, although the sampling apparatus 314 with a roller, substantially as described with reference to FIGS. 6 to 10, is described for applying pressure directly to a container, the system can be adapted for applying pressure to further packaging including containers, as described with reference to FIG. 11.

It will be understood that in further embodiments, a pressing member may be used together with the archway or contoured type sample head. As an example, the pressing member may apply pressure to a box and the sample is collected using a contoured sample head.

The above described embodiments are suitable for detecting leaks from a number of different types of containers, for example, bottles of distilled spirits, for example, whisky, processed meats, salad trays, frozen meats, beer kegs and fruit punnets. In particular, the roller system may be suitable for detecting leaks from, for example, fruit punnets, salad trays, frozen and processed meats. The non-contact archway may be suitable for detecting leaks from beer kegs and bottles.

While in the above embodiment, a pressure apparatus is described as forcing out the sample gas from the container, in further embodiments, gas or air, for example, a pressurised gas or pressurised air is injected into the container to force out a sample of gas from the container for testing.

In the above described embodiments, a sampling region remote from the sample chamber is described. In further embodiments, in place of the sample chamber, an open laser path may be used to detect the one or more materials, for example to monitor ethanol levels in a whisky storage warehouse. In some embodiments, a sample cell may be provided without a sample chamber.

A skilled person will appreciate that variations of the enclosed arrangement are possible without departing from the invention. Accordingly, the above description of the specific embodiment is made by way of example only and not for the purposes of limitations. It will be clear to the skilled person that minor modifications may be made without significant changes to the operation described

The invention claimed is:

1. A method of testing the structural integrity of a rigid container, the method comprising:
performing a sampling process on the rigid container provided inside non-rigid further packaging, wherein the non-rigid further packaging is closed for holding and/or transporting the rigid container and comprises one or more holes or gaps in a surface of the further packaging wherein the sampling process comprises:
applying a force to at least one surface of the non-rigid further packaging by contacting the at least one surface of the non-rigid further packaging with at least one pressing member and/or at least one roller thereby to extract a volume of sample gas from the one or more holes or gaps in the surface of said further packaging, such that, if the rigid container is leaking, the extracted sample of gas includes accumulated leaked gas or vapour from the rigid container and, such that, if the rigid container is not leaking, the extracted sample of gas does not include accumulated leaked gas or vapour from the rigid container;
wherein the method further comprises:
performing a detection process on the extracted volume of sample gas comprising:
producing one or more laser beams for excitation of one or more materials that may be in the volume of sample gas, wherein the one or more materials are representative of a gas and/or vapour and/or a liquid leak from the rigid container;
detecting light that has passed through the volume of sample gas and determining the presence and/or absence and/or amount of said one or more materials in the volume of sample gas based on detected light.

2. The method according to claim 1, wherein
the rigid container is sealed or closed for at least one of: prevention of tampering, preservation of contents, prevent leakage, hygiene purposes.

3. A method according to claim 1, further comprising providing a deformable sample member comprising a plurality of sample inputs distributed along its length and selecting a shape for the deformable sample head thereby to: match a shape of at least part of the rigid container and/or to minimize a gap between the plurality of sample inputs and at least part of a surface of the rigid container during the sampling process.

4. The method according to claim 1, wherein the sampling process comprises:
performing a suction or blowing process to move the sample of gas or vapour from a sampling region associated with the rigid container to a sample chamber, and wherein the suction or blowing process is performed continuously.

5. The method according to claim 1, wherein the method further comprises:
performing the sampling process on more than one rigid container and the suction or blowing process comprises providing a continuous air flow as the sampling process is performed on subsequent rigid containers.

6. The method according to claim 1, wherein the one or more materials comprises at least one of:
CO2, ethanol, CO, N20.

7. The method according to claim 1, wherein the rigid container is one of:
a drink container, an alcoholic or distilled drink container, a pharmaceutical product container, a medicine container, a perfume container, a barrel, a bottle, a dairy product container.

8. A method according to claim 1 wherein the sampling process comprises moving a moveable sample head proximate to at least one surface of the container.

9. A method according to claim 8 further comprising moving a moveable hand held device by a user.

10. A method according to claim 1, further comprising providing a substantially empty rigid container and the method further comprises providing a test gas to the container.

11. A method according to claim 10, wherein the test gas is one of CO2 or compressed air.

12. A method according to claim 10, further comprising providing the test gas to the empty rigid container thereby to place the rigid container under pressure before the sampling process is performed.

13. A method according to claim 1, further comprising providing a sample head, wherein the sample head comprises a shape that complements at least part of the rigid container.

14. A method according to claim 13, comprising selecting a shape of the sample head such that the at least part of the rigid container comes within a distance of at least 20 mm from the sample head during the sampling process.

15. A method according to claim 13, further comprising passing the rigid container through and/or past the sample head and performing the sampling process as the rigid container passes through and/or past the sample head.

16. A method according to claim 13, wherein the method further comprises aligning at least part of the rigid container with at least part of the sample head.

17. A method according to claim 13, further comprising sampling the volume of sample gas from a plurality of sample inputs that are distributed about the rigid container during the sampling process such that the sample region at least partially surrounds the rigid container.

18. A method according to claim 13, further comprising providing a plurality of sample inputs that are distributed along a first direction and moving the rigid container through the plurality of sample inputs in a second, different direction.

19. A method according to claim 18, wherein the first direction corresponds to a first dimension of the rigid container, for example, height, width or length.

20. A method according to claim 18, wherein the plurality of sample inputs comprises a plurality of different size holes to produce even suction.

21. A laser detection system for testing the structural integrity of a rigid container inside non-rigid further packaging, wherein the non-rigid further packaging is closed for holding and/or transporting the rigid container and comprises one or more holes or gaps in a surface of the further packaging, the system comprising:
a sampling apparatus comprising at least one pressing member and/or at least one roller configured to apply a force to at least one surface of further packaging containing the rigid container by contacting the at least one surface of the further packaging thereby to extract a volume of sample gas from the one or more holes or gaps in the surface of the further packaging, such that, if the rigid container is leaking, the extracted sample of gas includes accumulated leaked gas or vapour from the rigid container and, such that, if the rigid container is not leaking, the extracted sample of gas does not include accumulated leaked gas or vapour from the rigid container;
one or more lasers configured to produce one or more laser beams for excitation of one or more materials that may be in the volume of sample gas, wherein the one or more materials are representative of a gas and/or vapour and/or a liquid leak from the rigid container;
a detector apparatus for detecting light that has passed through the volume of sample gas and determining the presence and/or absence and/or amount of said one or more different materials in the collected sample based on detected light.

22. The system according to claim 21, further comprising a conveyer system for conveying at least a part of the rigid container past the sampling apparatus.

23. A system according to claim 21, further comprising a mechanism for rotating the rigid container, such that at least part of the rigid container passes the sampling apparatus.

24. The system according to claim 21, wherein
the rigid container is sealed or closed to for at least one of: prevention of tampering, preservation of contents, prevent leakage, hygiene purposes.

25. A system according to claim 24, wherein the sampling apparatus further comprises a sample head wherein the sample head comprises a shape that complements at least part of the rigid container.

26. A system according to claim 25, wherein the shape of the sample head is such that the at least part of the rigid container comes within a distance of 20 mm from the sample head during the sampling process.

27. A system according to claim 25, further comprising an alignment mechanism for aligning at least part of the rigid container with at least part of the sample head.

28. A system according to claim 25, wherein the sample head comprises a plurality of sample inputs distributed along its length such that, during the sampling process, the sample region at least partially surrounds the rigid container.

29. A system according to claim 25, wherein the sample head comprises a least one deformable sample member comprising a plurality of sample inputs distributed along its length wherein the deformable member is configured to be deformed into a shape thereby to: match a shape of at least part of the rigid container and/or to minimize a gap between the plurality of sample inputs and at least part of a surface of the rigid container during the sampling process.

30. A system according to claim 25, wherein the sample head comprises a shape that corresponds to at least one of: a rectangular archway, a bottle-shaped archway.

31. A system according to claim 25, wherein the sample head comprises a shape that is curved to match the shape of a barrel.

32. A system according to claim 25, wherein at least one of:
a) the sampling apparatus is a hand held sample head
b) the sampling apparatus comprises a nozzle.

33. A system according to claim 25, further comprising a test gas source for providing test gas to the rigid container via the sample head.

34. A method of detecting leaks from an alcoholic drink container the method comprising:
performing a sampling process on the alcoholic drink container inside further non-rigid packaging wherein the non-rigid further packaging is closed for holding and/or transporting the rigid container and comprises one or more holes or gaps in a surface of the further packaging, wherein the sampling process comprises:
applying a force to at least one surface of the further packaging by contacting the at least one surface of the further packaging with at least one pressing member and/or at least one roller thereby to extract a volume of sample gas from said further packaging, such that, if the alcoholic drink container is leaking, the sample of gas includes accumulated leaked gas or vapour from the alcoholic drink container and, such that, if the rigid container is not leaking, the extracted sample of gas does not include accumulated leaked gas or vapour from the rigid container;
wherein the method further comprises:
performing a detection process comprising:
producing one or more laser beams for excitation of one or more materials that may be in the volume of sample gas, wherein the one or more materials are representative of a gas and/or vapour and/or a liquid leak from the alcoholic drink container; and
detecting light that has passed through the volume of sample gas and determining the presence and/or absence and/or amount of said one or more materials in the sample gas based on detected light.

35. The method according to claim 34, wherein the one or more materials comprise at least one of ethanol and/or carbon dioxide.

36. The method according to claim 34, wherein the produced laser beams comprise at least one of:
a) a laser beam having a first wavelength in a wavelength range between 2963 to 2968 cm-1;
b) a laser beam having a second wavelength about 2250 cm-1.

* * * * *

UNITED STATES PATENT AND TRADEMARK OFFICE
CERTIFICATE OF CORRECTION

| | | |
|---|---|---|
| PATENT NO. | : 11,566,962 B2 | Page 1 of 1 |
| APPLICATION NO. | : 16/107734 | |
| DATED | : January 31, 2023 | |
| INVENTOR(S) | : Paul Black and Tom Hunter | |

It is certified that error appears in the above-identified patent and that said Letters Patent is hereby corrected as shown below:

On the Title Page

In Item (73), delete "Pure Storage, Inc., Mountain View, CA (US)" and substitute
--EMERSON PROCESS MANAGEMENT LIMITED, LEICESTER LE19 1UX, UNITED KINGDOM--.

Signed and Sealed this
Third Day of September, 2024

Katherine Kelly Vidal
*Director of the United States Patent and Trademark Office*